Nov. 28, 1950     A. M. MALOUF     2,531,522
PLIERS
Filed May 23, 1949
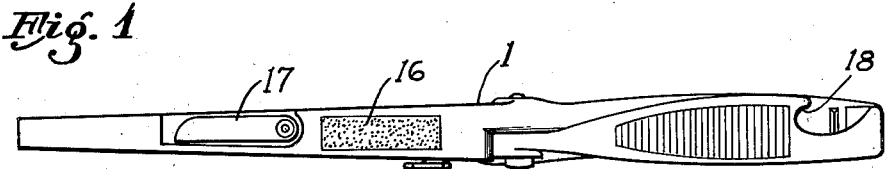
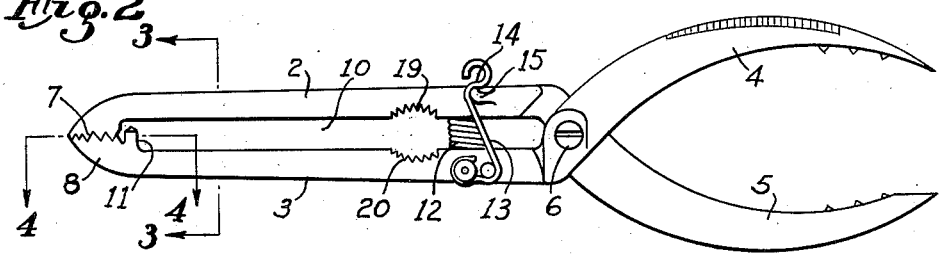
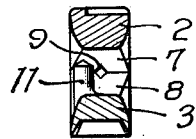 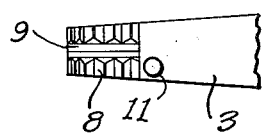
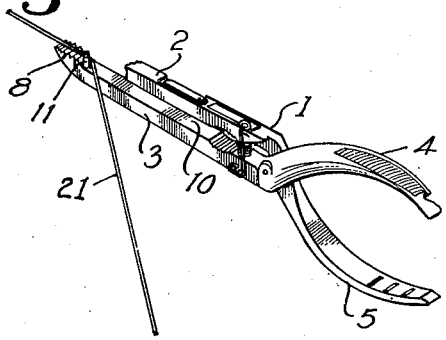
INVENTOR:
ABRAHAM M. MALOUF.
BY
ATTORNEY.

Patented Nov. 28, 1950

2,531,522

UNITED STATES PATENT OFFICE 2,531,522

PLIERS

Abraham M. Malouf, Burbank, Calif.

Application May 23, 1949, Serial No. 94,777

2 Claims. (Cl. 43—53.5)

The present invention relates to pliers generally, and more particularly to an instrumentality of particular use by fishermen. The pliers of the invention incorporate many useful parts which aid the fisherman in killing, cleaning, and scaling the fish, and provide means whereby the pliers may be directed to the fish hook.

An object is the provision of pliers which are inexpensive in cost of manufacture, easily operated and generally superior to pliers now known to the inventor.

With the above mentioned and other objects in view, the invention consists in the novel and useful provision, formation, construction, association, and relative arrangement of parts, members and features, all as shown in one embodiment in the accompanying drawing, and described generally and more particularly pointed out in the claims.

In the drawing:

Figure 1 is a top plan view of the pliers;

Figure 2 is a side elevation of the pliers;

Figure 3 is a sectional view on the line 3—3, Figure 2;

Figure 4 is a fragmentary plan view of one of the jaw members of the pliers, the same being taken on line 4—4 of Figure 2; and Figure 5 is a fragmentary perspective view showing the pliers engaging the fish line for directing the pliers to the fish hook.

Referring with particularity to the drawing, the improved pliers are designated as an entirety by 1 and the same includes a pair of jaws 2 and 3 provided with handles 4 and 5, the handles being crossed and pivotally connected at 6 whereby approach of the handles separates the jaws in the well understood manner.

The nose portions of the jaws are provided with toothed portions at 7 and 8. The teeth on each jaw extend transversely thereof as shown in Figure 4 and there is a groove 9 extending longitudinally intermediate the teeth on each jaw. As shown in the drawing, the portions of the jaws rearward of the toothed areas and extending to the pivot point 6 are separated or spaced apart, as shown in Figure 2 at 10. A pin 11 is formed on one of the jaws and is received within the spaced area 10. In the present instance, said pin extends vertically relative to the jaw 3 and is positioned adjacent the innermost tooth of teeth 8 of said jaw. This pin is positioned at one side of the groove 9 and extends above the plane of the toothed area when the jaws are closed, as shown in Fig. 3.

A coil spring 12 normally urges the jaws to separate while a springe wire 13 has a hook at 14 for engaging a catch 15. The spring wire 13 is carried by the jaw member 3 while the catch 15 is secured to the side of jaw member 2. Thus, when the jaws are closed as shown in Figure 2, the hook will engage the catch. Other features of the device which form no part of the claimed structure, include an abrasive area externally positioned on jaw 2 as shown at 16. A swing knife carried by said jaw at 17, a bottle cap opener 18 carried by the handle 4 and toothed concavities at 19 and 20.

The present invention, however, is directed specifically to the jaws and the nose construction, together with the pin 11, and the means for holding the jaws releasably locked together.

The operation, uses and advantages of the invention just described are as follows:

When the fisherman makes a catch and it is desired to release the fish hook from the fish, the plier jaws are opened and pin 11 is brought into contact with the fish line 21 in the manner shown in Figure 5. This causes a bend in the fish line, as shown in Figure 5, and directs the fish line into the grove 9 of jaw 3. The operator then presses the handles 4 and 5 together which automatically locks the jaws together. The fish line is then positioned within the grooves 9 of both jaws. The operator holds the fish line, and pushes the pliers toward the fish until the hook is reached. The hook is then disengaged from the fish by the pliers in the usual manner. The pin also functions as a means whereby the upper side of the head of the fish may be contacted for the purpose of pinching the head or breaking the fish's neck.

I claim:

1. A pliers construction, including a pair of hinged jaws each having a nose end, the nose end of each jaw being formed with transverse teeth and each jaw being provided with a longitudinal groove bisecting said teeth, and a pin carried by one jaw and adjacent the teeth thereof and positioned at one side of the longitudinal groove therein.

2. A pliers construction, including a pair of jaws hinged together, one end of each jaw being provided with teeth, said jaw in the toothed area in each instance being formed with a longitudinal groove, each jaw being spaced from the other between its hinge point and the tooth area, and a pin carried by one of the said jaws inward of the toothed area thereof and at one side of the longitudinal groove.

ABRAHAM M. MALOUF.

REFERENCES CITED

The following references are of record in the file of this patent:

UNITED STATES PATENTS

| Number | Name | Date |
|---|---|---|
| 488,785 | Bernard | Dec. 27, 1892 |
| 1,661,365 | Gendron | Mar. 6, 1928 |